US008407123B2

(12) United States Patent
Jacoby

(10) Patent No.: US 8,407,123 B2
(45) Date of Patent: Mar. 26, 2013

(54) METHODS AND SYSTEMS FOR PROVIDING A YIELD CURVE INDEX

(75) Inventor: Paul Jacoby, New York, NY (US)

(73) Assignee: Barclays Capital Inc., New York, NY (US)

( * ) Notice: Subject to any disclaimer, the term of this patent is extended or adjusted under 35 U.S.C. 154(b) by 154 days.

(21) Appl. No.: 13/094,126

(22) Filed: Apr. 26, 2011

(65) Prior Publication Data

US 2011/0270725 A1 Nov. 3, 2011

Related U.S. Application Data

(60) Provisional application No. 61/329,671, filed on Apr. 30, 2010.

(51) Int. Cl.
*G06Q 40/00* (2012.01)
(52) U.S. Cl. ......................................................... 705/35
(58) Field of Classification Search ..................... 705/35
See application file for complete search history.

(56) References Cited

U.S. PATENT DOCUMENTS

| 7,930,238 | B2* | 4/2011 | Frankel | 705/37 |
| 7,987,132 | B2* | 7/2011 | Payne et al. | 705/36 R |
| 2008/0091583 | A1* | 4/2008 | Gorton et al. | 705/36 R |
| 2009/0048964 | A1* | 2/2009 | Bloom | 705/37 |

OTHER PUBLICATIONS

Kempf, "Trading System and Market Integration", Dec. 7, 1996, Journal of Financial Intermediation, Article No. JF980244, 20 pages.*
Lehman Brothers Treasury Co., "Securities Note dated May 14, 2007", 130 pages.*
Stoll, "Commodity Index Investing and Commodity Future Prices", Sep. 10, 2009, Vanderbilt University, 69 pages.*

* cited by examiner

*Primary Examiner* — Elda Milef
*Assistant Examiner* — Abdulmajeed Aziz
(74) *Attorney, Agent, or Firm* — Cowan, Liebowitz & Latman, P.C.; Steven D. Underwood

(57) ABSTRACT

An exemplary aspect comprises a computer system comprising: (a) one or more servers that receive electronic data describing prices for a first category of futures positions; and (b) one or more processors that calculate an index value at a specified time based on one or more weighted price changes for said first category of futures positions, wherein said index value has a target exposure to one or more yields for said first category of futures positions. In one or more exemplary embodiments, the computer system further comprises one or more processors that receive electronic data describing prices for a second category of futures positions, wherein the index value at the specified time is based on one or more differences between weighted price changes for the first category of futures positions and the second category of futures positions. Other exemplary aspects comprise related methods and software.

60 Claims, 12 Drawing Sheets

FIG. 9
Index target exposures
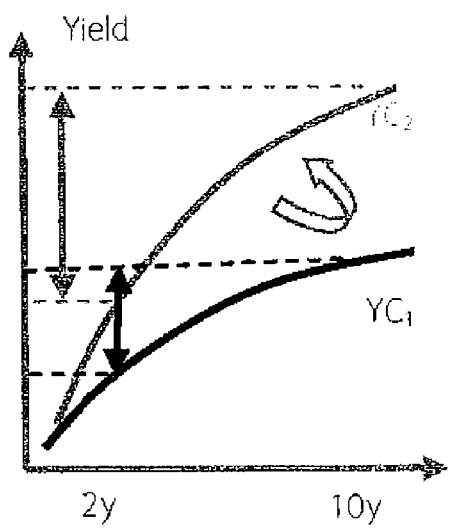
1 point/bp exposure to curve
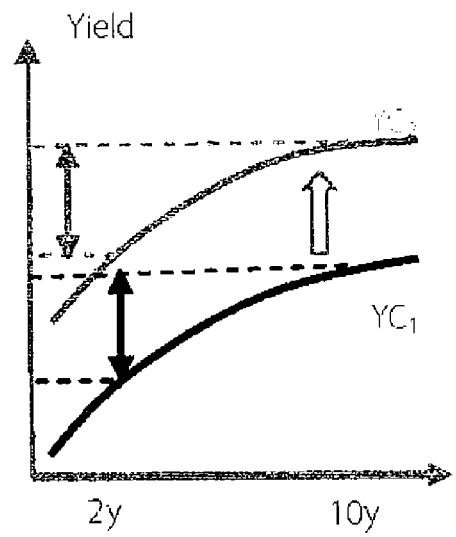
Zero exposure to parallel shift
Source: Barclays Capital

FIG. 10

Regression results, 1999-2009, daily data

| Test | A | B₁ (Slope) | B₂ (Level) |
|---|---|---|---|
| 1: On-the-run yields | 0.04 | 0.78* | 0.11* |
| 2: CTD yields | -0.02 | 1.00* | 0.01 |
| Target sensitivity | 0.00 | 1.00 | 0.00 |

*Statistically significant at the 95% level.

Source: Bloomberg, Barclays Capital

FIG. 11

Historical statistics

| Index statistics | Value |
|---|---|
| Average annualised change in index level | 26.2 |
| Annualised standard deviation of changes | 60.3 |
| Average daily curve steepening | 24.5bp |
| Average daily change during curve steepening | 24.1 |
| Average daily curve flattening | -21.0bp |
| Average daily change during curve flattening | -21.0 |

Note: Statistics for the index are expressed in changes in index level, not in returns, as explained in the earlier box "Absolute return format."
Curve steepening or flattening is defined as the daily change in the 2y-10y CTD yield spread for days where the CTD bond did not change.
Source: Barclays Capital

METHODS AND SYSTEMS FOR PROVIDING A YIELD CURVE INDEX

CROSS REFERENCE TO RELATED APPLICATIONS

This application claims priority to U.S. Provisional Patent Application No. 61/329,671, filed Apr. 30, 2010. The entire contents of that application are incorporated herein by reference.

INTRODUCTION

Certain information in this description has been derived from publicly available information. This information has not been independently verified and no representation or warranty is made as to its accuracy or completeness. The information is included as background only and should not be used to limit the described invention in any way.

U.S. Treasury notes are coupon-bearing U.S. government bonds with various maturities. U.S. Treasury futures contracts ("Treasury futures contracts") are legally binding agreements for the buying or selling of U.S. Treasury notes at a fixed price for physical settlement on a future date. Treasury futures contracts permit the delivery in satisfaction of a maturing contract of any one of a pre-specified basket of eligible U.S. Treasury notes.

Two-year Treasury futures contracts ("2-year Treasury futures contracts") have a face value of $200,000 and require the delivery of a U.S. Treasury note with an original term to maturity of not more than five years and three months and a remaining term to maturity of not less than one year and nine months from the first day of the delivery month and a remaining term to maturity of not more than two years from the last day of the delivery month. 2-year Treasury futures contracts are traded on the Chicago Board of Trade ("CBOT"). The closing prices of 2-year Treasury futures are calculated by CBOT and reported on Bloomberg under symbol "TU".

Ten-year Treasury futures contracts ("10-year Treasury futures contracts") have a face value of $100,000 and require the delivery of a U.S. Treasury note with a remaining maturity of at least six years and six months, but not more than ten years, from the first day of the delivery month. 10-year Treasury futures contracts are traded on the CBOT. The closing prices of 10-year Treasury futures are calculated by CBOT and reported on Bloomberg under symbol "TY".

While the description herein tends to focus on an exemplary embodiment related to 2-year and 10-year Treasury futures contracts, those skilled in the art will understand that other embodiments may be applied to other futures contracts (e.g., 5-year, long bond,[1] and ultra-long[2]), and to other sovereign bonds (e.g., UK, Germany, Italy, Japan).

[1] See, for example, http://www.cmegroup.com/trading/interest-rates/us-treasury/30-year-us-treasury-bond.html.
[2] CME was the first to offer "ultra-long" futures contracts. See http://www.cmegroup.com/trading/interest-rates/ultra-tbond-futures.html: " "The key feature distinguishing the Ultra T-Bond from the existing T-Bond futures contract is the relatively narrow range of deliverable securities. The deliverable basket for Ultra T-Bond futures comprises cash Treasury bonds with at least 25 years of remaining term to maturity. By comparison, deliverable securities for the existing T-Bond contract are bonds with remaining terms to maturity of 15 years or more.

Price/Yield Relationship

As described in further detail below, the prices of 2-year and 10-year Treasury futures contracts will generally increase or decrease in response to a corresponding increase or decrease in the market price of the relevant underlying U.S. Treasury notes and bonds (for brevity, the term "notes" is often used herein to refer to notes and/or bonds; those skilled in the art will understand this from the context). The market price of any U.S. Treasury note is inversely related to its yield-to-maturity, or "yield." A note's yield is calculated as the internal rate of return that would cause the discounted value of the sum of the expected future cash flows generated by the note (including the interest payments and the principal amount due on the note) to be equal to the note's current purchase price. As the dollar amount of the remaining cash flows payable on a U.S. Treasury note until its maturity (i.e., interest payments and principal) does not change, a note's yield will increase when the market price of the note decreases, and vice versa. The prevailing yield for a U.S. Treasury note is reported as an annual percentage rate.

The current yields for 2-year U.S. Treasury notes or 10-year U.S. Treasury notes ("2-year Treasury notes" and "10-year Treasury notes", respectively, and each, a "Treasury note") are published by common data providers such as Bloomberg based on their reported trading prices. Aggregate yields for 2-year and 10-year Treasury notes are currently published on Bloomberg pages USGG2YR Index and USGG10YR Index, respectively.

Yield Curve for U.S. Treasury Notes

At a given point in time, the yields of U.S. Treasury notes across the maturity spectrum can be plotted in order to illustrate the U.S. Treasury "yield curve." The graphs in FIG. 2 provide examples, at different historical points in time, of the different shapes of yield curves for U.S. Treasury notes with maturities of between 2 and 10 years. As is known in the art, the difference between 2-year and 10-year yield is a popular expression of curve slope.

An upward sloping yield curve, as exemplified by the graph curves in FIG. 2 labeled "19-Nov-2007" and "14-Oct-2009", indicates that the 2-year/10-year spread on those dates was positive, as the prevailing yields for 10-year Treasury notes exceeded the prevailing yields for 2-year Treasury notes. A generally flat yield curve, as exemplified by the FIG. 2 graph curve labeled "9-Dec-2005", indicates that the 2-year/10-year spread on that date was approximately zero. An "inverted" yield curve, as exemplified by the FIG. 2 graph curve labeled "14-Apr-2000", indicates that the 2-year/10-year spread on that date was negative, as the prevailing yields for 2-year Treasury notes exceeded the prevailing yields for 10-year Treasury notes.

When the 2-year/10-year spread increases, the yield curve is said to "steepen," as illustrated by the progression of the yield curve from Nov. 19, 2007 to Oct. 14, 2009 in the relevant FIG. 2 graphs. Conversely, when the 2-year/10-year spread decreases, the yield curve is said to "flatten."

U.S. Treasury Yield Curve and its Relationship to Broader Market Factors

The shape of the yield curve tends to indicate the market's expectations about the direction of U.S. monetary policy and inflationary expectations in the economy, as well as supply and demand factors impacting U.S. Treasury notes of different maturities, among other factors.

Modified Duration

The concept of "modified duration" relates to the expected percentage change, or sensitivity, in a note's price for a given change in yield. In general, as yields increase, modified duration decreases; as yields decline, modified duration increases. Modified duration approximates the expected percentage change in the price of the note for a small change in yield through the following formula:

$$\text{Modified Duration} = -\frac{\text{Change in Note Price}}{\text{Note Price} \times \text{Change in Yield}}$$

For example, a 10-year note with a modified duration of 8 implies that if its yield were to increase by 0.01% (for example, due to a 0.01% increase in the prevailing 10-year interest rate), one would expect a 0.08% decrease in the price of such note. Modified duration, therefore, provides a useful indication of the price volatility of a U.S. Treasury note. Moreover, the modified duration of a CTD[3] note underlying a particular Treasury futures contract may also provide a useful indication of the expected change in price of that Treasury futures contract for a given change in the CTD note yield. However, modified duration serves only as an approximation of the expected change in the price of a note in response to a corresponding change in yield, and its accuracy and reliability decrease as the relevant change in yield increases.

[3] Treasury futures contracts permit the delivery of any one of a basket of bonds. The cheapest-to-deliver (CTD) bond for a given futures contract is the bond that generates the greatest gain or least loss upon delivery for the investor with a short position in the contract. CTD is discussed in more detail below.

A longer-maturity note will generally tend to demonstrate greater price sensitivity to changes in yields than a shorter-maturity note with the same coupon rate, since the implications of yield movements are felt over longer periods of time. Therefore, the modified duration of notes with longer maturities (such as 10-year Treasury notes) will generally exceed the modified duration of notes with shorter maturities (such as 2-year Treasury notes).

The modified duration of the CTD notes underlying the 2-year and 10-year Treasury futures contracts are published on Bloomberg and can be accessed as follows: (a) access the Bloomberg page for the relevant 2-year or 10-year Treasury futures contract; (b) apply the "DLV" function, which will indicate the CTD note for the relevant Treasury futures contract as the first in a list of the current eligible-to-deliver notes for that Treasury futures contract; (c) access the relevant CTD note's Bloomberg page; and (d) apply the "YA" function, which will indicate the current modified duration of the relevant CTD note under the heading "Adj/Mod Duration."

Cheapest-to-Deliver ("CTD") Notes

By their terms, U.S. Treasury futures contracts permit the delivery in satisfaction of a maturing futures contract of any one of a pre-specified basket of eligible U.S. Treasury notes and bonds. Because of the broadly defined delivery specifications, a significant number of securities, varying in terms of coupon and maturity, may be eligible for delivery at the time of settlement.

The varied pricing terms available in the basket of eligible deliverable bonds are reflected in the futures contract by making an adjustment to the invoice price due at the time of settlement. Treasury futures utilize a "conversion factor" to calculate the invoice price in order to properly reflect the value of the security that is tendered. The intent of the conversion factor is to render equally economic the delivery of any eligible-for-delivery securities. However, even after application of the conversion factor, some discrepancies in the market prices of the eligible-to-deliver U.S. Treasury notes and the adjusted settlement price of the futures contract are likely to remain. As a result, one of the eligible-for-delivery U.S. Treasury notes will be the "cheapest-to-deliver"—i.e., its market price relative to the adjusted settlement price for the futures contract is such that its delivery will result in the greatest gain or smallest loss to the seller.

Relationship Between Yields and Futures Prices

The change in price of a Treasury futures contract is related directly to two components: (1) the change in price of the current cheapest-to-deliver U.S. Treasury note underlying the relevant Treasury futures contract (the "CTD note") and (2) the changes in the prices of the other eligible-to-deliver notes, as they become more or less likely to take the role of CTD note upon the maturity of the futures contract. The market price of a Treasury futures contract will generally increase in response to an increase in the price of its underlying CTD note, since the owner of the futures contract would receive a more valuable note upon maturity of the relevant Treasury futures contract. In contrast, the market price of a Treasury futures contract will generally decrease in response to a decrease in the price of its underlying CTD note, since the owner of the futures contract would receive a less valuable note upon maturity of the relevant Treasury futures contract.

Price Quotations for Treasury Futures Contracts

Market prices of 2-year Treasury futures contracts are quoted as a percentage of the par value of the relevant futures contract to the nearest $1/128$th of 1.00% of par. For example, a 2-year Treasury futures contract quoted at 106-80 equates to a value of 106% of par plus $80/128$ths, with a decimal equivalent of 106.625 and a dollar value of $213,250.00.

Market prices of 10-year Treasury futures contracts are quoted as a percentage of the par value of the relevant futures contract to the nearest $1/64$th of 1.00% of par. For example, a 10-year Treasury futures contract quoted at 106-40 equates to a value of 106% of par plus $40/64$ths, with a decimal equivalent similar to that of a 2-year Treasury futures contract quoted at 106-80 (i.e., 106.625). However, a 10-year Treasury futures contract quoted at 106-40 will have a lower dollar value ($106,625.00) than a 2-year Treasury futures contract quoted at 106-80, owing to the lower face value of a 10-year Treasury futures contract. For purposes of calculating the index embodiments described below, the relevant 2-year and 10-year Treasury futures contract prices may be calculated using the decimal equivalents of their publicly quoted prices.

Analogous conventions apply to 5-year, long bond, and ultra-long futures contracts, as will be known to those skilled in the art.

The General Form of Steepener Positions

A yield curve "steepener" position typically describes an investment position that benefits from an increase in long-term note yields relative to shorter-term note yields, or a decrease in short-term note yields relative to longer-term note yields, but is neutral with respect to overall increases or decreases in yields across the yield curve. A steepener position will generally decrease in value in response to either an increase in short-term note yields relative to longer-term note yields, or a decrease in long-term note yields relative to shorter-term note yields. A weighted steepener position, such as the position simulated by the index embodiments described herein, is designed to retain a constant value in response to equal increases or decreases in short-term and long-term yields (i.e., a directional movement in the yield curve) without any resultant change in the slope of the yield curve.

As illustrated in the table below, any profit or loss on a steepener position on the prevailing yields for 2-year and 10-year U.S. Treasury notes should be determined by an increase or decrease, respectively, in the 2-year/10-year spread, and not on the absolute levels of the yields. However, the level of the Index, and the market value of the ETNs,[4] may be influenced by factors other than any underlying changes in the yield curve during the term of the ETNs.

[4] An exchange-traded note (ETN) is a senior, unsecured, unsubordinated debt security issued by an underwriting bank.

| Steepener Position | 2-year yields increase 1.00% | 2-year yields unchanged | 2-year yields decrease 1.00% |
|---|---|---|---|
| 10-year yields increase 1.00% | No change | Profit | Profit |
| 10-year yields unchanged | Loss | No change | Profit |
| 10-year yields decrease 1.00% | Loss | Loss | No change |

An exemplary aspect comprises a computer system comprising: (a) one or more servers that receive electronic data describing prices for a first category of futures positions; and (b) one or more processors that calculate an index value at a specified time based on one or more weighted price changes for the first category of futures positions, wherein the index value has a target exposure to one or more yields for the first category of futures positions.

In one or more exemplary embodiments, and combinations thereof: (1) the computer system further comprises one or more processors that receive electronic data describing prices for a second category of futures positions, wherein the index value at the specified time is based on one or more differences between weighted price changes for the first category of futures positions and the second category of futures positions; (2) the first category of futures positions relates to United States Treasury futures contracts; (3) the first category of futures positions relates to non-United States sovereign bond futures contracts; (4) the first and second categories of futures positions relate to United States Treasury futures contracts; (5) the first category of futures positions relates to United States Treasury futures contracts and the second category of futures positions relates to non-United States sovereign bond futures contracts; (6) the first category of futures positions relates to two-year United States Treasury futures contracts; (7) the first category of futures positions relates to five-year United States Treasury futures contracts; (8) the first category of futures positions relates to ten-year United States Treasury futures contracts; (9) the first category of futures positions relates to long bond United States Treasury futures contracts; (10) the first category of futures positions relates to ultra-long United States Treasury futures contracts; (11) the prices are based on cheapest-to-deliver prices for bonds underlying the United States Treasury futures contracts; (12) the index value is calculated using an additive, non-compounding absolute return format; (13) the target exposure is one index value point for each basis point increase in the yield; (14) one or more weights for the one or more weighted price changes are periodically rebalanced; (15) one or more weights for the one or more weighted price changes are selected in order to approximate the target exposure; (16) one or more weights for the one or more weighted price changes are calculated based at least in part on modified durations of cheapest-to-deliver bonds; (17) one or more weights for the one or more weighted price changes are calculated based on a reduced modified duration of a cheapest-to-deliver bond; (18) one or more weights for the one or more weighted price changes are calculated based at least in part on closing prices for the first category of futures positions and closing prices for the second category of futures positions on a day preceding the specified time; and (19) the first and second categories of futures positions relate to non-United States sovereign bond futures contracts.

As is explained below, other exemplary aspects comprise related methods and software.

BRIEF DESCRIPTION OF THE DRAWINGS

FIG. 9 depicts exemplary index target exposures.

FIG. 10 depicts exemplary regression results, 1999-2009, daily data.

FIG. 11 depicts historical statistics relating to an exemplary embodiment.

DETAILED DESCRIPTION OF CERTAIN EXEMPLARY EMBODIMENTS

Exemplary embodiments of the present invention are described below. Those skilled in the art will appreciate that the scope of the invention is not limited, for example, to US treasuries, and also encompasses, for example, other sovereign bonds.

As explained below, design of steepener positions and constant yield curve positions using Treasury Futures contracts is complex. An exemplary embodiment uses weighted positions in 2-year and 10-year Treasury futures and maintains those weightings during monthly rebalancing. Other exemplary embodiments are based on 5-year, long bond, and ultra-long futures, for example (ticker designations FV, US, and WN).

Moreover, while certain exemplary embodiments described herein relate to an index based on two categories of futures (e.g., 2-year and 10-year), those skilled in the art will understand that the targeted exposure aspects described herein are equally applicable to an index based on a single category of futures.

An exemplary embodiment (referenced herein as "US Treasury 2 y/10 y Yield Curve Index" or "YCI" or simply "the index") reflects the returns of 2 y and 10 y futures positions weighted to target a constant exposure to changes in the slope of the curve. The index serves as a benchmark for yield curve strategies. Other applications of the invention (for example, using different futures) will be apparent to those skilled in the art after reading the present description.

Dynamics of the Yield Curve

As explained above, the U.S. Treasury yield curve reflects the yields at which the U.S. government borrows for different terms to maturity. The shape of the curve is in part driven by market expectations of the path of future short rates, which are closely related to the state of the economy and inflation expectations. The curve is also driven by other factors, including time varying risk-premium and technical supply and demand dynamics.

Targeted Exposure to the Yield Curve

Figure 3:
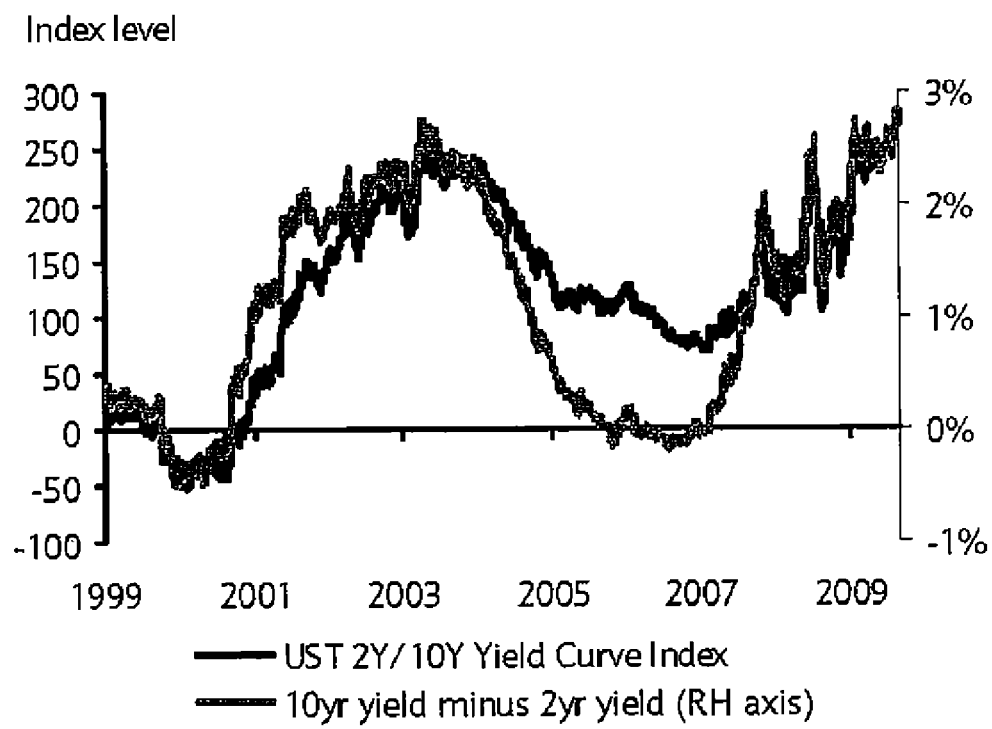
FIG. 3 depicts UST 2 y/10 y Index vs. 2 y/10 y slope of the yield curve.

In one or more exemplary embodiments, the index provides a benchmark for strategies using futures to implement views on the shape (and/or direction) of the yield curve. The index tracks weighted positions in US Treasury 2 y and 10 y futures that rebalance monthly. See FIG. 3.

In one or more exemplary embodiments, the YCI targets a 1 point increase in index level for every 1 bp (0.01%) of either a decrease in yield of a single point or an increase in yield difference between two yields (e.g., the 2 y and 10 y cheapest-to-deliver bonds), and a 1 point decrease in index level for every 1 bp of either an increase in yield of a single point or a decrease in yield difference between two yields. The index rolls quarterly from the front contracts to the immediate next contracts to maintain liquidity. In one or more embodiments, YCI is an absolute return index.

Absolute Return Index

In an exemplary embodiment, YCI uses an additive, non-compounding absolute return format. The index starts at zero, and each day increments by an amount equal to the change in weighted futures prices. The index therefore can take negative values.

$$I_t = I_{t-1} + W_2 \times (P_{2,t} - P_{2,t-1}) - W_{10} \times (P_{10,t} - P_{10,t-1}), \text{where:}$$

$I_t$ is the index level on day t;

$W_2$, $W_{10}$ are the 2 y and 10 y futures weightings; and $P_{2,t}$, $P_{10,t}$ are the 2 y and 10 y futures prices on day t.

This format maintains a constant absolute, rather than percentage, exposure over time of 1 index point per basis point change in 2 y/10 y slope. The index level approximates the 2 y/10 y yield curve slope expressed in basis points.

For example, the yield curve slope on Feb. 12, 2010 was 286 bp, and the index level was 277. This format reduces the extent to which movements of the 2 y/10 y slope between two points in time affect the change in index level between those points. Percentage index returns, and volatility of percentage returns, have no economic interpretation. Index performance must be measured in terms of change in index value, and volatility as standard deviation of changes.

Understanding the Drivers of the Yield Curve

The natural shape of a yield curve is considered to be upward sloping, reflecting the term premium earned for locking up capital and the additional risk-premium associated with longer duration instruments. However, many fundamental and technical factors affect the slope, including the following:

Fundamental Factors

Monetary policy: The yield curve embeds market expectations for the path of future short-term interest rates. A steep curve may reflect expectations of increasing short rates over the relevant period.

Figure 4:
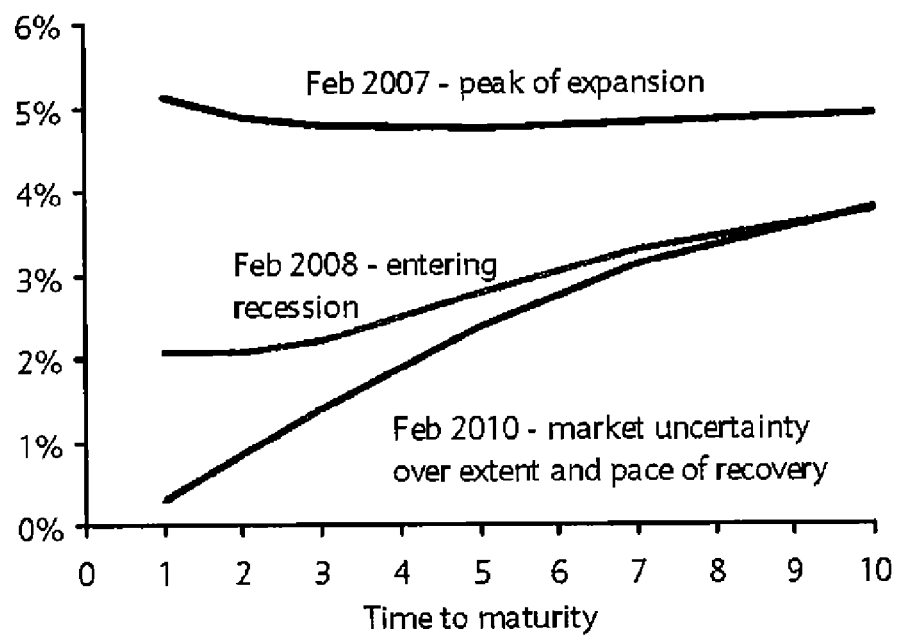
FIG. 4 depicts yield curve and the state of the economy, 2007-2010.
Figure 5:
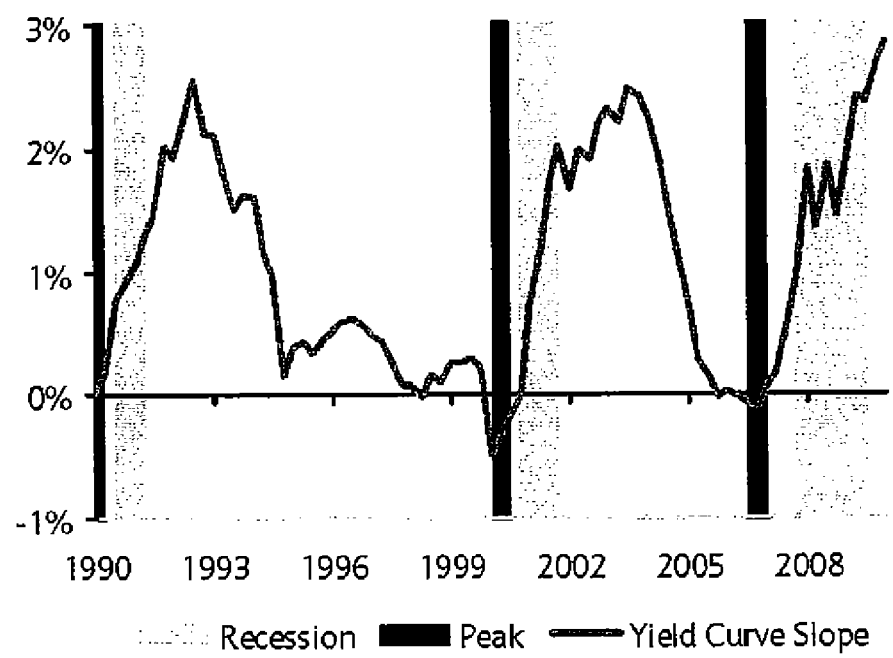
FIG. 5 depicts 2 y/10 y slope and U.S. economy, 1990-2010.

Business cycle: The slope has a close tie with the state of the economy, as shown in FIG. 4. Empirically, the slope tends to steepen during early stages of a downturn, and flatten in the recovery stages. The curve may invert near the peak of an expansion (see FIG. 5).

Figure 6:
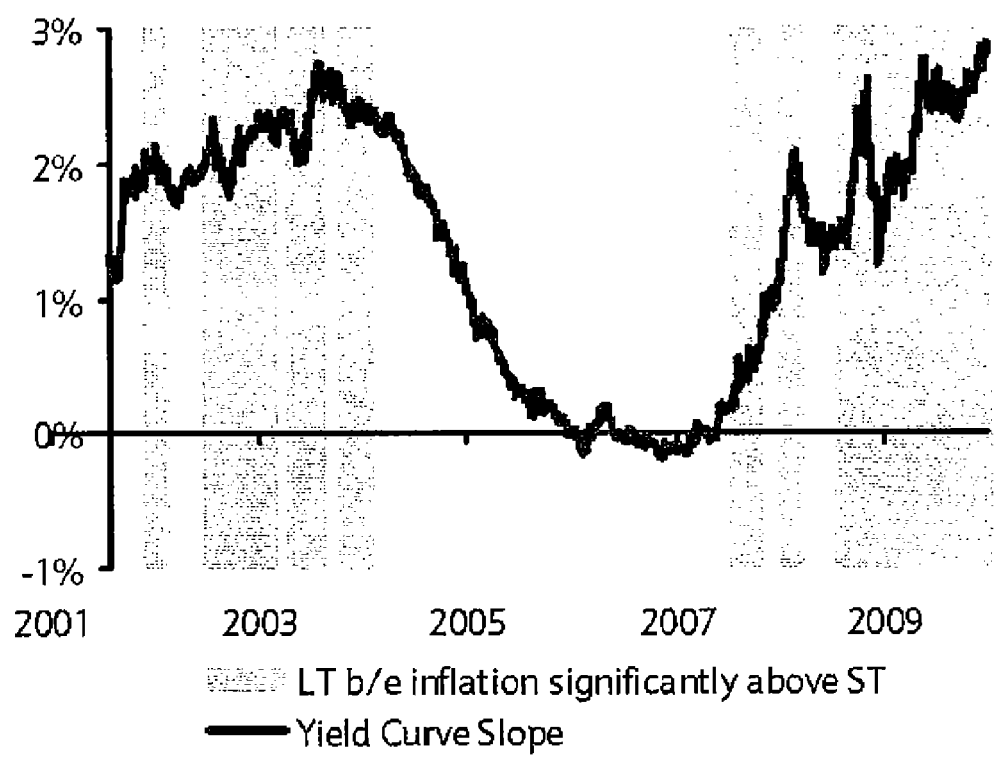
FIG. 6 shows that 2 y/10 y is steeper when inflation is expected to increase.

Inflation expectations: Inflation and interest rates are closely related. The 2 y/10 y curve may reflect differences in short- and longer-term inflation expectations, as illustrated empirically in FIG. 6. The shaded regions highlight periods in which long-term inflation expectations (10 y breakevens) are substantially above shorter-term inflation expectations (5 y breakevens). The slope tends to be steepening in these periods, and is flattening in periods where longer-term inflation is not expected to be much higher than medium term.

Technical Factors

Treasury supply: Surprises in the schedule or volume of Treasury issuance can affect the shape of the curve. For example, a higher-than-expected size for a 10 y bond auction could lead to a steepening of the curve.

Investor demand: Treasury investors are highly diverse with differing preferences, requirements, and constraints. This segmentation of demand can affect the yields on certain parts of the curve.

Exemplary Index Framework

Exemplary Index Calculation

In an embodiment, a US 2 y-10 y Yield Curve Index reflects the performance of a weighted portfolio of 2 y and 10 y US Treasury futures positions. The returns are based on the price performance of a long position in 2 y futures and a short position in 10 y futures. Those skilled in the art, after reviewing the present description, will understand that this particular embodiment is exemplary only, and that the invention described herein also encompasses indexes based, for example, on weighted positions in single futures, and positions in foreign sovereign futures.

Exemplary Weights Calculation

Figure 7:
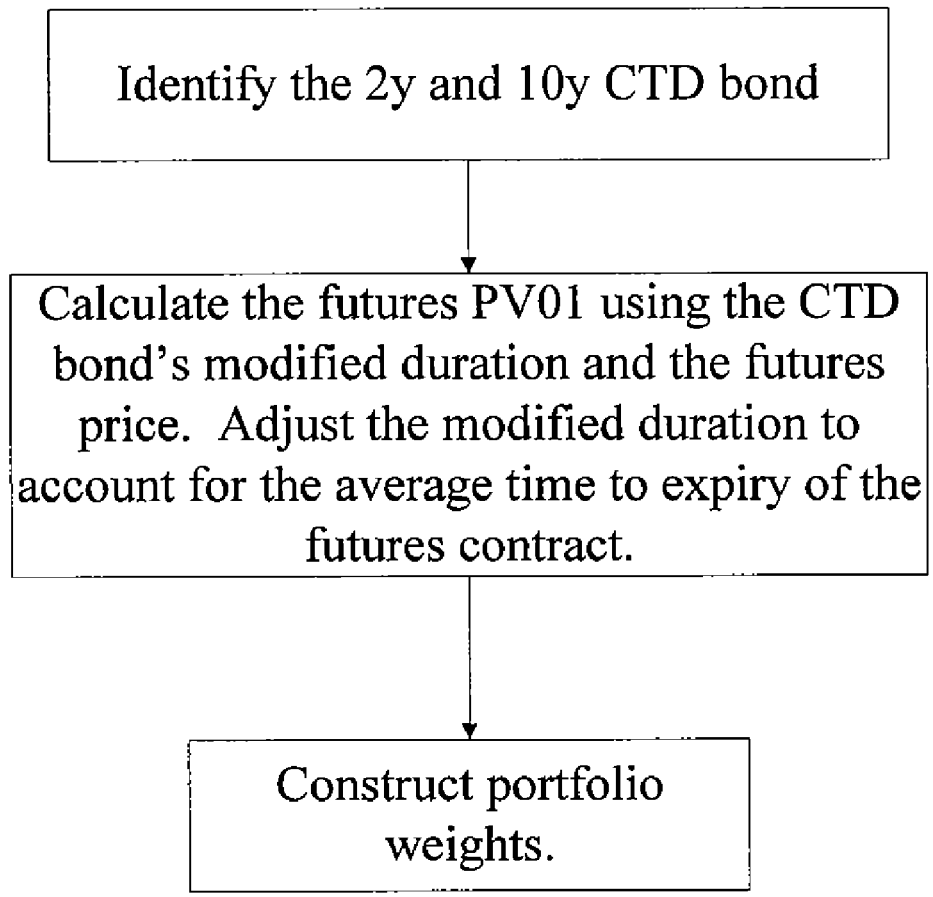
FIG. 7 depicts exemplary steps for a weights calculation.
Figure 8:
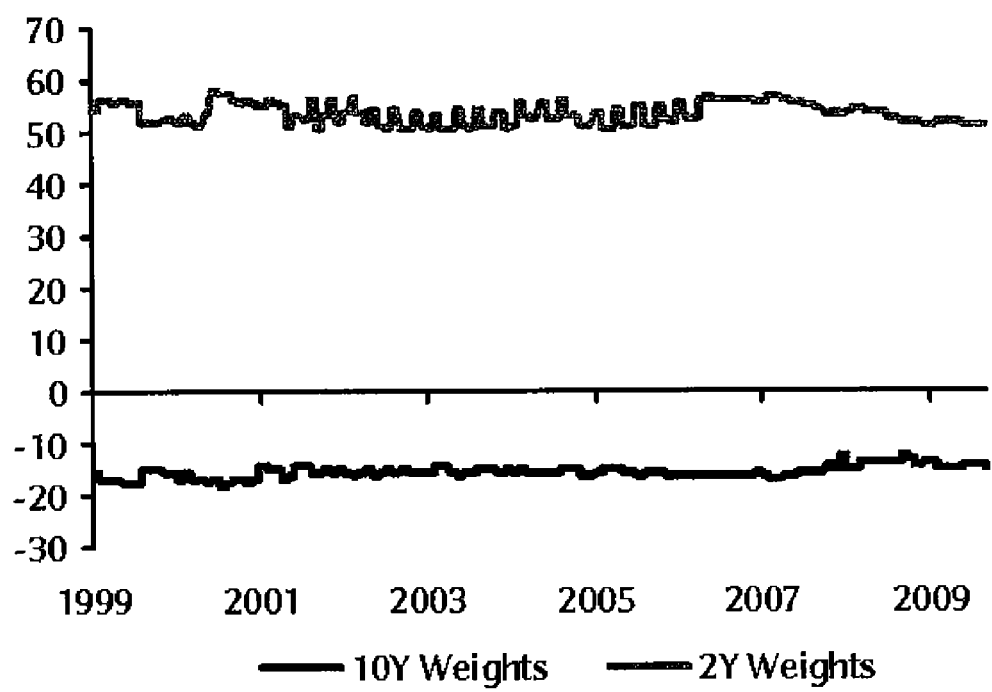
FIG. 8 depicts index weights on 2 y and 10 y futures.

The 2 y and 10 y weights may be calculated by scaling the futures PV01 by the Target Exposure. The Target Exposure is 1 point/bp, since one is targeting a 1 point increase in the index level for every 1 bp increase in the 10 y yield relative to the 2 y yield. The futures PV01 may be calculated by taking a snapshot of the current CTD bond for the applicable 2 y futures contract and the applicable 10 y futures contract on the rebalance date. The index weights may be rebalanced every month to maintain the desired steepening exposure. See FIGS. 7 and 8.

The Cheapest-to-Deliver Bond (CTD)

As noted above, Treasury futures contracts permit the delivery of any one of a basket of bonds. The cheapest-to-deliver (CTD) bond for a given futures contract is the bond that generates the greatest gain or least loss upon delivery for the investor with a short position in the contract. The CTD for a given futures contract can be found on Bloomberg using the "DLV" function. For example:

TYH1 Comdty DLV <GO> for the March 2011 10 y Note futures contract.

Why use the CTD Bond?

The futures PV01 is calculated based on the duration of the current CTD bond. The change in price of the futures contract is primarily driven by the change in price of the current CTD bond, and therefore its duration is the most relevant for the futures PV01. To a lesser extent, the futures price is also driven by changes in the prices of other deliverable bonds, as they become more likely to take the role of CTD bond at the expiration of the futures contract.

Index Target Exposures

An exemplary objective of the index is to achieve a fixed targeted exposure per basis point to changes in the slope, and minimal exposure to parallel shifts (FIG. 9), or to changes in individual yields. Curve steepness is, in an exemplary embodiment, measured as the difference between the yield of the CTD bond under the 10 y futures contract and its yield under the 2 y futures contract.

Evaluating Index Performance

In order to evaluate the effectiveness of the index, one may use the following regression:

Change in Index level=A+$B_1$×Change in Slope (bp)+$B_2$×Change in Level (bp)+Error term, where Level is the average of the 2 y and 10 y yields, and Slope is the difference between 10 y and 2 y yields.

FIG. 10 shows exemplary results of running this regression for two tests that use different yield data:

Test 1 uses the on-the-run benchmark 2 y and 10 y yields (GT2 Govt and GT10 Govt on Bloomberg), which are commonly quoted measures of the yield curve. Test 2 uses the actual yields of the 2 y and 10 y CTD bonds, excluding days on which the CTD changes from one bond to another.

Index performance differs marginally from target levels in Test 1, with a lower sensitivity to slope changes, and a non-zero sensitivity to level changes. This deviation is to be expected since the index cannot target generic benchmark rates. The index performs very close to target when evaluated against the actual CTD yields, in Test 2. This confirms that the index construction, using futures PV01 weightings based on CTD duration, is effective.

Figure 12:
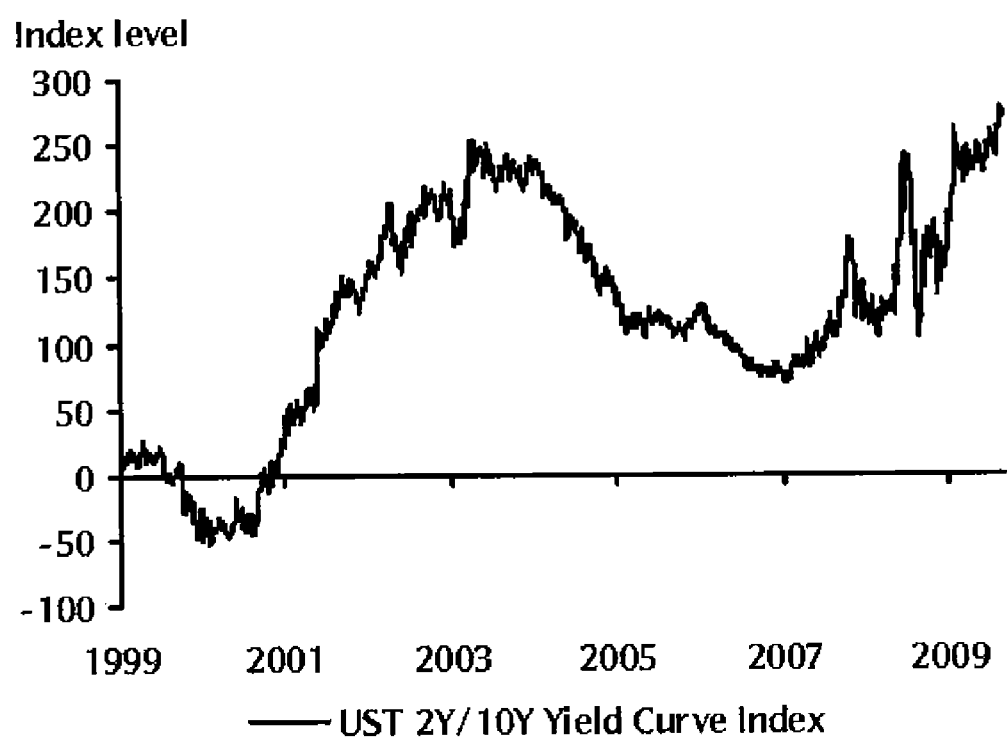
FIG. 12 depicts an exemplary index history.

Exemplary historical performance (see FIGS. 11 and 12). Note regarding FIG. 11: Statistics for the index are expressed in changes in index level, not in returns, as explained above under "Absolute return index." Curve steepening or flattening is defined as the daily change in the 2 y-10 y CTD yield spread for days where the CTD bond did not change.

Other embodiments may rely on a broader aspect of the invention that embodies using an approximation of the Treasury futures' sensitivity to changes in yield to determine the weighting, and having the approximation reference the Cheapest-to-Delivery bond's duration, reduced by an amount representing the effect of repo financing until delivery.

In a specific exemplary embodiment, the weightings are calculated as follows, and rebalanced on the second-to-last business day of each month:

$$W_{10} = \frac{100}{\frac{F_{10}}{100} \times \left(D_{10} - \frac{T}{12}\right)}$$

$$W_2 = \frac{100}{\frac{F_2}{100} \times \left(D_2 - \frac{T}{12}\right)}$$

$W_{10}$ and $W_2$ are the weightings for the 10 y and 2 y treasury futures positions;

$F_{10}$ and $F_2$ are the closing prices of the relevant 2 Y and 10 Y Treasury Futures on the day preceding the rebalance day;

$D_{10}$ and $D_2$ are the modified durations of the CTDs of the relevant 2 Y and 10 Y Treasury Futures on the day preceding the rebalance day. The modified duration of a bond is a measure of the expected percentage change in a bond's price for a given change in yield;

T is the number of months between the next rebalancing date and the middle of the delivery month of the relevant 10 y or 2 y Treasury Futures contract, rounded to the nearest half month. The value T/12 is intended to reduce the duration of the CTD to reflect the effect of financing to expiry.

More generally, in the above and certain other exemplary embodiments, the weightings for the treasury futures positions are rebalanced using an approximation for the DV01 of the treasury futures. Generally speaking, DV01 may be interpreted as "Dollar Value of 01 basis point" and PV01 may be interpreted as "Present Value of 01 basis point"; each refers to the monetary value of a 1 bp change in the yield of the bond. PV01/DV01 differs from Modified Duration, which refers to the relationship between return (expressed as a percentage) and changes in yield. Exemplary embodiments use an approximation of PV01 that starts with the modified duration of the CTD bond and reduces it by an amount that reflects the duration of the required repo financing.

As explained above, those skilled in the art will understand that other embodiments may be applied to other futures. Details of exemplary methodology for Bund and Gilt futures are provided below.

The "Weight"$^W$ may be calculated on an Index Rebalance Date according to the following formula:

$$W = \frac{\text{Target Exposure}}{\frac{F}{100} \times \left(\text{Duration} - \frac{T}{12}\right)}$$

Where:

Target Exposure is 100;

F is the Underlying Futures Price (quoted as a percentage of par) of the relevant Underlying Futures Contract for the Index Business Day immediately preceding that Index Rebalance Date;

Duration is the Modified Duration of the Cheapest-To-Deliver Bond for the relevant Underlying Futures Contract at the exchange close;

T is the number of days between the Index Rebalance Date immediately following that Index Rebalance Date and a specified day of the expiry month of the relevant Underlying Futures Contract, such number of days divided by 365 and multiplied by 12, with the result rounded to the nearest half: for the Bund Index, this specified day is the 8th calendar day (without adjustment) of the relevant expiry month, while for the Gilt Index and the US Treasury Index, this specified day is the 15th calendar day (without adjustment) of the relevant expiry month.

The "Cheapest-To-Deliver Bond" is the eligible-for-delivery security for a particular bond futures contract which generates the greatest gain or least loss upon delivery for the investor with a short position in that contract. The relevant Cheapest-To-Deliver Bond may be determined for a given Index Business Day according to Bloomberg page <DLV>.

The "Modified Duration" of a given bond measures the expected percentage change in bond price for a small change in yield to maturity. The Modified Duration for the relevant Cheapest-To-Deliver Bond may be calculated on Bloomberg using the field <DUR_ADJ_MID>.

The value of (Duration—T/12) in the formula for the Weight is intended to approximate the price sensitivity of the relevant Underlying Futures Contract to changes in the yield of the corresponding Cheapest-To-Deliver Bond over the one month period from one Index Rebalance Date to the next Index Rebalance Date.

Exemplary embodiments comprise computer components and computer-implemented steps that will be apparent to those skilled in the art. For example, calculations and communications can be performed electronically, and results can be displayed using a graphical user interface.

Figure 1:
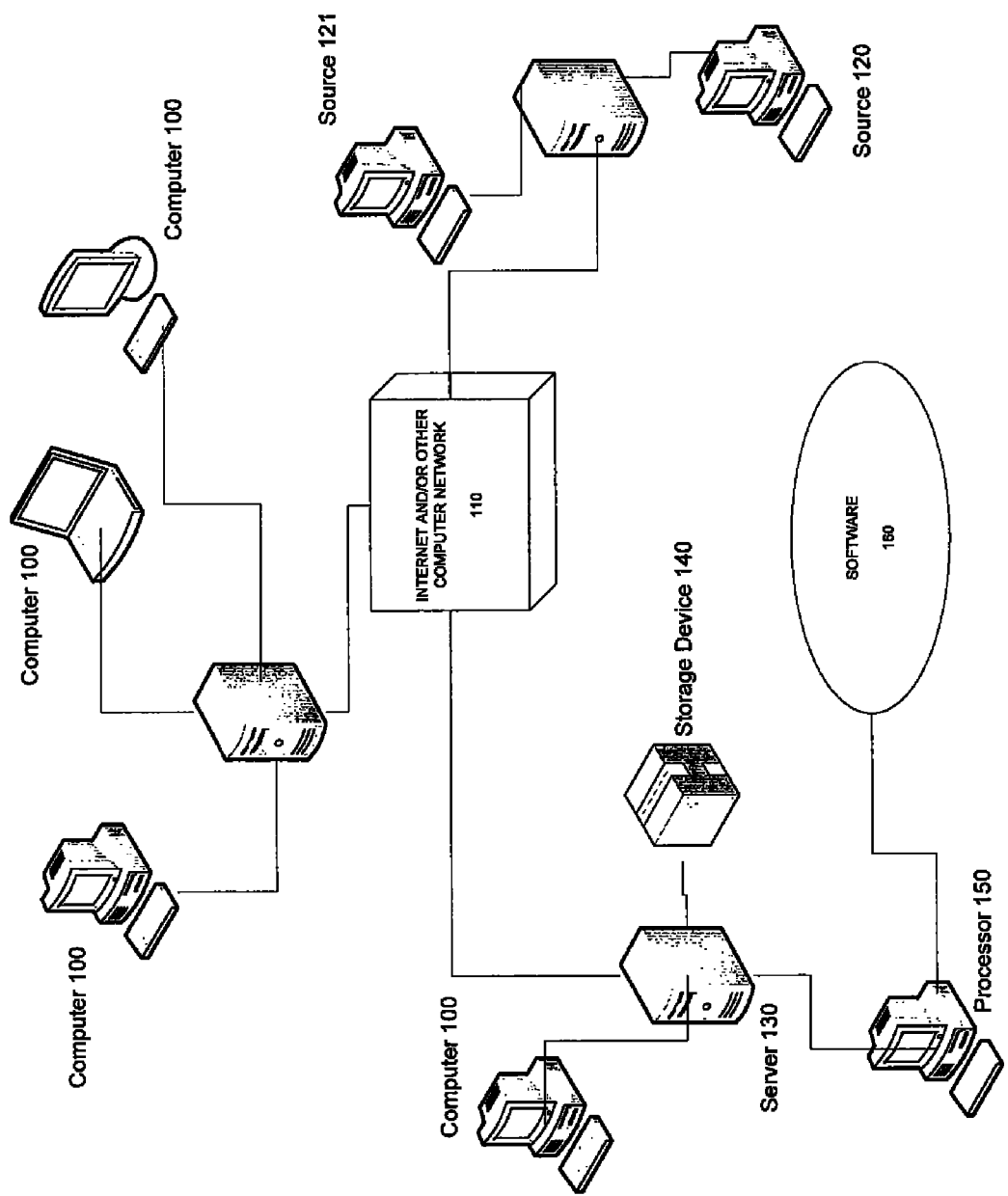
FIG. 1 depicts an exemplary computer system that may used in connection with one or more exemplary embodiments.
Figure 2:
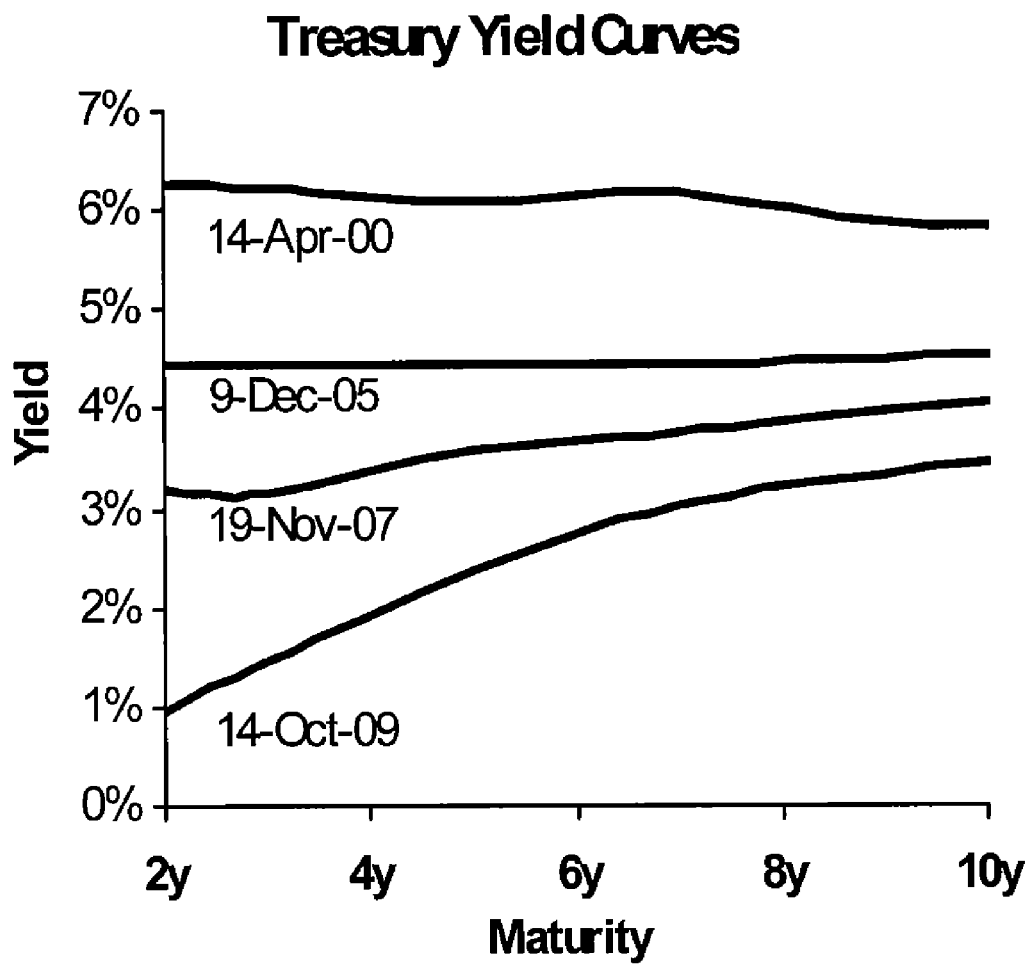
FIG. 2 depicts different shapes of yield curves for U.S. Treasury notes with maturities of between 2 and 10 years.

An exemplary such system is depicted in FIG. 1. Computers 100 communicate via network 110 with a server 130. A plurality of sources of data 120-121 relating to, for example, CTD information, also communicate via network 110 with a server 130, processor 150, and/or other components operable to calculate and/or transmit, for example, portfolio weighting and related information. The server 130 may be coupled to one or more storage devices 140, one or more processors 150, and software 160.

Other components and combinations of components may also be used to support processing data or other calculations described herein as will be evident to one of skill in the art. Server 130 may facilitate communication of data from a storage device 140 to and from processor(s) 150, and communications to computers 100. Processor 150 may optionally include or communicate with local or networked storage (not shown) which may be used to store temporary or other information. Software 160 can be installed locally at a computer 100, processor 150 and/or centrally supported for facilitating calculations and applications.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the description and/or claims could be the same processor. All such combinations are within the scope of the invention.

Alternatively, or in combination, processing and decision-making may be performed by functionally equivalent circuits such as a digital signal processor circuit or an application specific integrated circuit.

Many routine program elements, such as initialization of loops and variables and the use of temporary variables, are not described in detail herein for brevity. Moreover, it will be appreciated by those of ordinary skill in the art that unless otherwise indicated, the particular sequence of steps described is illustrative only and can generally be varied without departing from the scope of the invention. Unless otherwise stated, the processes described herein are unordered—that is, the processes can be performed in any reasonable order.

All steps described herein will and should be understood by those skilled in the art as being capable of implementation by software, where feasible. Moreover, such software will be understood by those skilled in the art to be storable on a non-transitory computer readable medium and implementable by one or more computer processors.

As will be understood by those skilled in the art, the skilled practitioner may make many changes in the apparatus and methods described above without departing from the scope of the invention.

We claim:

1. A method comprising:
   (a) receiving electronic data describing prices for a first category of futures positions; and
   (b) calculating with a processing system an index value at a specified time based on one or more weighted price changes for said first category of futures positions, wherein said index value has a target exposure to one or more yields for said first category of futures positions, wherein said processing system comprises one or more processors.

2. A method as in claim 1, further comprising receiving electronic data describing prices for a second category of futures positions, wherein said index value at said specified time is based on one or more differences between weighted price changes for said first category of futures positions and said second category of futures positions.

3. A method as in claim 1, wherein said first category of futures positions relates to United States Treasury futures contracts.

4. A method as in claim 1, wherein said first category of futures positions relates to non-United States sovereign bond futures contracts.

5. A method as in claim 2, wherein said first and second categories of futures positions relate to United States Treasury futures contracts.

6. A method as in claim 2, wherein said first category of futures positions relates to United States Treasury futures contracts and said second category of futures positions relates to non-United States sovereign bond futures contracts.

7. A method as in claim 3, wherein said first category of futures positions relates to two-year United States Treasury futures contracts.

8. A method as in claim 3, wherein said first category of futures positions relates to five-year United States Treasury futures contracts.

9. A method as in claim 3, wherein said first category of futures positions relates to ten-year United States Treasury futures contracts.

10. A method as in claim 3, wherein said first category of futures positions relates to long bond United States Treasury futures contracts.

11. A method as in claim 3, wherein said first category of futures positions relates to ultra-long United States Treasury futures contracts.

12. A method as in claim 3, wherein said prices are based on cheapest-to-deliver prices for bonds underlying said United States Treasury futures contracts.

13. A method as in claim 1, wherein said index value is calculated using an additive, non-compounding absolute return format.

14. A method as in claim 1, wherein said target exposure is one index value point for each basis point increase in said yield.

15. A method as in claim 1, wherein one or more weights for said one or more weighted price changes are periodically rebalanced.

16. A method as in claim 1, wherein one or more weights for said one or more weighted price changes are selected in order to approximate said target exposure.

17. A method as in claim 1, wherein one or more weights for said one or more weighted price changes are calculated based at least in part on modified durations of cheapest-to-deliver bonds.

18. A method as in claim 1, wherein one or more weights for said one or more weighted price changes are calculated based on a reduced modified duration of a cheapest-to-deliver bond.

19. A method as in claim 1, wherein one or more weights for said one or more weighted price changes are calculated based at least in part on closing prices for said first category of futures positions and closing prices for said second category of futures positions on a day preceding said specified time.

20. A method as in claim 2, wherein said first and second categories of futures positions relate to non-United States sovereign bond futures contracts.

21. A computer system comprising:
one or more servers that receive electronic data describing prices for a first category of futures positions; and
one or more processors that calculate an index value at a specified time based on one or more weighted price changes for said first category of futures positions, wherein said index value has a target exposure to one or more yields for said first category of futures positions.

22. A computer system as in claim 21, further comprising one or more processors that receive electronic data describing prices for a second category of futures positions, wherein said index value at said specified time is based on one or more differences between weighted price changes for said first category of futures positions and said second category of futures positions.

23. A computer system as in claim 21, wherein said first category of futures positions relates to United States Treasury futures contracts.

24. A computer system as in claim 21, wherein said first category of futures positions relates to non-United States sovereign bond futures contracts.

25. A computer system as in claim 22, wherein said first and second categories of futures positions relate to United States Treasury futures contracts.

26. A computer system as in claim 22, wherein said first category of futures positions relates to United States Treasury futures contracts and said second category of futures positions relates to non-United States sovereign bond futures contracts.

27. A computer system as in claim 23, wherein said first category of futures positions relates to two-year United States Treasury futures contracts.

28. A computer system as in claim 23, wherein said first category of futures positions relates to five-year United States Treasury futures contracts.

29. A computer system as in claim 23, wherein said first category of futures positions relates to ten-year United States Treasury futures contracts.

30. A computer system as in claim 23, wherein said first category of futures positions relates to long bond United States Treasury futures contracts.

31. A computer system as in claim 23, wherein said first category of futures positions relates to ultra-long United States Treasury futures contracts.

32. A computer system as in claim 23, wherein said prices are based on cheapest-to-deliver prices for bonds underlying said United States Treasury futures contracts.

33. A computer system as in claim 21, wherein said index value is calculated using an additive, non-compounding absolute return format.

34. A computer system as in claim 21, wherein said target exposure is one index value point for each basis point increase in said yield.

35. A computer system as in claim 21, wherein one or more weights for said one or more weighted price changes are periodically rebalanced.

36. A computer system as in claim 21, wherein one or more weights for said one or more weighted price changes are selected in order to approximate said target exposure.

37. A computer system as in claim 21, wherein one or more weights for said one or more weighted price changes are calculated based at least in part on modified durations of cheapest-to-deliver bonds.

38. A computer system as in claim 21, wherein one or more weights for said one or more weighted price changes are calculated based on a reduced modified duration of a cheapest-to-deliver bond.

39. A computer system as in claim 21, wherein one or more weights for said one or more weighted price changes are calculated based at least in part on closing prices for said first category of futures positions and closing prices for said second category of futures positions on a day preceding said specified time.

40. A computer system as in claim 22, wherein said first and second categories of futures positions relate to non-United States sovereign bond futures contracts.

41. An article of manufacture storing software in a non-transitory computer readable medium, said software configured to direct one or more processors to perform at least the following steps:
(a) receiving electronic data describing prices for a first category of futures positions; and
(b) calculating with a processing system an index value at a specified time based on one or more weighted price changes for said first category of futures positions, wherein said index value has a target exposure to one or more yields for said first category of futures positions.

42. An article of manufacture as in claim 41, further comprising software configured to direct one or more processors to perform at least the step of receiving electronic data describing prices for a second category of futures positions, wherein said index value at said specified time is based on one or more differences between weighted price changes for said first category of futures positions and said second category of futures positions.

43. An article of manufacture as in claim 41, wherein said first category of futures positions relates to United States Treasury futures contracts.

44. An article of manufacture as in claim 41, wherein said first category of futures positions relates to non-United States sovereign bond futures contracts.

45. An article of manufacture as in claim 42, wherein said first and second categories of futures positions relate to United States Treasury futures contracts.

46. An article of manufacture as in claim 42, wherein said first category of futures positions relates to United States Treasury futures contracts and said second category of futures positions relates to non-United States sovereign bond futures contracts.

47. An article of manufacture as in claim 43, wherein said first category of futures positions relates to two-year United States Treasury futures contracts.

48. An article of manufacture as in claim 43, wherein said first category of futures positions relates to five-year United States Treasury futures contracts.

49. An article of manufacture as in claim 43, wherein said first category of futures positions relates to ten-year United States Treasury futures contracts.

50. An article of manufacture as in claim 43, wherein said first category of futures positions relates to long bond United States Treasury futures contracts.

51. An article of manufacture as in claim 43, wherein said first category of futures positions relates to ultra-long United States Treasury futures contracts.

52. An article of manufacture as in claim 43, wherein said prices are based on cheapest-to-deliver prices for bonds underlying said United States Treasury futures contracts.

53. An article of manufacture as in claim 41, wherein said index value is calculated using an additive, non-compounding absolute return format.

54. An article of manufacture as in claim 41, wherein said target exposure is one index value point for each basis point increase in said yield.

55. An article of manufacture as in claim 41, wherein one or more weights for said one or more weighted price changes are periodically rebalanced.

56. An article of manufacture as in claim 41, wherein one or more weights for said one or more weighted price changes are selected in order to approximate said target exposure.

57. An article of manufacture as in claim 41, wherein one or more weights for said one or more weighted price changes are calculated based at least in part on modified durations of cheapest-to-deliver bonds.

58. An article of manufacture as in claim 41, wherein one or more weights for said one or more weighted price changes are calculated based on a reduced modified duration of a cheapest-to-deliver bond.

59. An article of manufacture as in claim 41, wherein one or more weights for said one or more weighted price changes are calculated based at least in part on closing prices for said first category of futures positions and closing prices for said second category of futures positions on a day preceding said specified time.

60. An article of manufacture as in claim 42, wherein said first and second categories of futures positions relate to non-United States sovereign bond futures contracts.

* * * * *